US010936194B2

United States Patent
Koester et al.

(10) Patent No.: US 10,936,194 B2
(45) Date of Patent: Mar. 2, 2021

(54) STORAGE DEVICE STATUS MANAGEMENT FOR CONFLICT AVOIDANCE IN A DATA STORAGE SYSTEM

(71) Applicant: INTERNATIONAL BUSINESS MACHINES CORPORATION, Armonk, NY (US)

(72) Inventors: Michael J. Koester, Hollister, CA (US); Kevin L. Miner, Lake City, FL (US); Thao Bui, San Jose, CA (US); Richard A. Schaeffer, Antioch, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/161,872

(22) Filed: Oct. 16, 2018

(65) Prior Publication Data

US 2020/0117366 A1    Apr. 16, 2020

(51) Int. Cl.
    *G06F 3/06* (2006.01)
(52) U.S. Cl.
    CPC .......... *G06F 3/0605* (2013.01); *G06F 3/0619* (2013.01); *G06F 3/0653* (2013.01); *G06F 3/0683* (2013.01)
(58) Field of Classification Search
    CPC .... G06F 3/0605; G06F 3/0619; G06F 3/0653; G06F 3/0683
    See application file for complete search history.

(56) References Cited

U.S. PATENT DOCUMENTS

| 6,473,836 B1* | 10/2002 | Ikeda ................. G06F 12/0862 711/122 |
| 8,161,146 B2 | 4/2012 | Baldiga et al. |
| 9,921,872 B2 | 3/2018 | Greiner et al. |
| 2002/0091828 A1* | 7/2002 | Kitamura ............... G06F 3/0605 709/226 |
| 2005/0144404 A1* | 6/2005 | Nashimoto ........... G06F 3/0607 711/154 |
| 2012/0047292 A1* | 2/2012 | Tamura .................. G06F 1/266 710/17 |

(Continued)

OTHER PUBLICATIONS

DFSMS Introduction, IBM Corporation, Document SC23-6851-30, 2017, pp. 148.

(Continued)

*Primary Examiner* — Aracelis Ruiz
(74) *Attorney, Agent, or Firm* — William K. Konrad; Konrad Raynes Davda & Victor LLP

(57) ABSTRACT

In one aspect of storage device status management in accordance with the present description, a host can determine not only whether a particular volume maintained by a storage unit controlled by a storage controller is on-line with respect to another host, but also whether that volume is actually in use by another host. Accordingly, should one host determine that a volume is in use by another host, the one host can defer its use of the volume until the volume is no longer in use by another host. In this manner, conflicts which may lead to loss of data integrity may be reduced or eliminated, providing a significant improvement in computer technology. Other features and aspects may be realized, depending upon the particular application.

27 Claims, 6 Drawing Sheets

(56) References Cited

U.S. PATENT DOCUMENTS

2016/0191308 A1  6/2016  Berry
2016/0321437 A1  11/2016  Kimmell et al.

OTHER PUBLICATIONS

DFSMShsm Storage Administration, IBM Corporation, Document SC23-6871-30, 2017, pp. 1632.
Consolidation of Information from Heterogeneous Status Tracking Systems, Anonymous, IP.com, IP.com No. IPCOM000202311D, Dec. 13, 2010, pp. 3.
Interface to Show Which System Vary Online To a Specific DASD Device, Anonymous, IP.com, IP.com No. IPCOM000215742D, Mar. 8, 2012, pp. 2.
Write Inhibit a Single DASD Device at the System Level Using the Path Group Identifier, Anonymous, IP.com, IP.com No. IPCOM000247896D, Oct. 10, 2016, pp. 2.

* cited by examiner

STORAGE DEVICE STATUS MANAGEMENT FOR CONFLICT AVOIDANCE IN A DATA STORAGE SYSTEM

BACKGROUND OF THE INVENTION

1. Field

The present invention relates to a computer program product, system, and method for storage device status management in data storage systems.

2. Description of the Related Art

Data backup systems can provide continuous availability of production data in the event of a sudden catastrophic failure at a single point in time or data loss over a period of time. In one such disaster recovery system, production data is replicated from a local site to a remote which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy. Stored data may be encrypted to prevent unauthorized access to the stored data.

Data is frequently stored in units of storage referred to as "volumes." In data mirroring systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship. Primary and secondary storage controllers may be used to control access to the primary and secondary storage devices.

Depending upon the distance between primary and secondary storage systems, data may be synchronously or asynchronously copied from the primary storage site to the secondary storage site. Data may be copied in consistency groups, such that the second copy at the secondary site is consistent as of a point in-time to a first copy of the data at the primary site. In a consistency group, the order of dependent writes is preserved in the copying of the data.

Input/output (I/O) operations may be used to transfer data between a host and I/O devices of an I/O processing system. For example, data may be written from memory of a host to one or more I/O devices, and data may be read from one or more I/O devices to memory of a host by executing I/O operations in response to commands from a host. An I/O device may include a data storage device and a storage control unit or storage controller to control the data storage device. The storage controller may be physically separate from the storage device being controlled or may be embedded within it.

To facilitate processing of I/O operations, an I/O subsystem of the I/O processing system may be employed. The I/O subsystem is coupled to a host and the I/O devices of the I/O processing system and directs the flow of information between the host and the I/O devices. One example of an I/O subsystem is a channel subsystem. The channel subsystem uses channel paths as communications media.

A channel path may logically connect a host adapter of a host to a device adapter of an I/O device. A host may be identified by a unique path group identification (ID).

In order for a host to have access to a volume and conduct I/O operations directed to that volume of an I/O device, in many systems, the host and the volume are logically "grouped" together. A host and a volume which have been grouped in this manner are considered to be "on-line" with respect to each other.

An I/O device may include a status data structure which indicates which volumes of the I/O device are grouped to which hosts as identified by path group ID's. Thus, a volume may be grouped with multiple hosts so that those multiple hosts as identified by their unique path group IDs, each have access to that volume. Conversely, a host may be grouped with multiple volumes, so that those volumes may each be accessed by the host as identified by its unique path group ID.

If a host no longer needs access to a volume, the host and the volume are "ungrouped" so that the host and the volume are no longer on-line with respect to each other, but instead are "off-line" with respect to each other. If so, the I/O device data structure may be updated to indicate the change in status from on-line to off-line for a host and volume which were previously grouped but have subsequently been ungrouped.

A host may determine whether a particular volume is on-line and if so, determine which host (or path group ID) is on-line with the volume by issuing a query command such as a "query host access" command, for example, in some known systems. In response to such a query command, the I/O device which receives the query reads the status data structure and reports accordingly to the requesting host. The report indicates whether a volume is on-line to one or more hosts and if so, identifies by path group ID the host or hosts with which the volume is on-line. The information returned by this command is typically set by software, and may include for example the name of the host or hosts online to the volume, and identify the host complex if any, of the on-line host.

SUMMARY

Storage device status management in accordance with the present description, provides a significant improvement in computer technology. For example, in one aspect of storage device status management of the present description, a host can determine not only whether a particular volume is on-line with respect to another host, but also determine whether that volume is actually in use by another host. Accordingly, should one host determine that a volume is in use by another host, the one host can defer its use of the volume until the volume is not longer in use by another host. In this manner, conflicting uses which may lead to loss of data integrity may be reduced or eliminated, providing a significant improvement in computer technology.

In one embodiment, a storage controller receives from a first host, a volume status request for a volume of a storage unit controlled by the storage controller; and in response to the status request, returns a volume status report indicating whether the volume is in use by a host. The volume status report further indicates, in one embodiment, the identity of a host using the volume if the volume is in use by a host. The volume status report further indicates, in one embodiment, whether the volume is on-line to a host and if so, further identifies a host to which the volume is on-line. In response to a volume status report indicating that the volume is in use by another host, the first host in one embodiment, may defer use of the volume by the first host until the volume is indicated by a volume status report to no longer be in use by another host. In this manner, conflicts which may lead to loss of data integrity may be reduced or eliminated, providing a significant improvement in computer technology.

In another aspect of storage device status management in accordance with the present description, a second host uses a volume on-line to that second host, and indicates to the storage controller that the volume is in use. In response to the second host indicating that the volume is in use, the storage controller updates an in-use status field of a status data structure for the volume indicating that the volume is in use. Upon terminating the use of the volume, the second host indicates to the storage controller that the volume is no longer in use. In response to the second host indicating that the volume is no longer in use, the storage controller updates the in-use status field of the status data structure for the volume indicating that the volume is not in use. In this manner, a storage controller may maintain the in-use status of each volume and report that in-use status for each volume residing on the storage unit or units controlled by that storage controller. As a result, conflicting uses of a volume by different hosts may be reduced or eliminated, providing a significant improvement in computer technology.

In still another aspect of storage device status management in accordance with the present description, in response to grouping a volume of the storage unit and a second host having a path group ID unique to the second host, the storage controller updates an on-line status field of the status data structure for the volume of the grouping to indicate that the volume is on-line to the second host of the grouping. In response to ungrouping the volume and the second host of the grouping, the storage controller updates the on-line status field of the status data structure for the volume of the ungrouping to indicate that the volume is off-line to the second host identified by its path group ID. In one embodiment, in response to ungrouping a volume and a host, the storage controller updates both the on-line status field of a status data structure for the volume indicating that the volume is off-line with respect to a host identified by its path group ID, and updates an in-use status field of the status data structure for the volume indicating that the volume is not in use by the host of the ungrouping. For volumes in use by a host identified by path group ID, the host using the volume may be reported to another volume in a report identifying the using host by path group ID. Such identification of a particular host using a volume to other hosts may further facilitate conflict avoidance to preserve data integrity.

Implementations of the described techniques may include hardware, a method or process, or computer software on a computer-accessible medium. Other features and aspects may be realized, depending upon the particular application.

DETAILED DESCRIPTION

Figure 1:
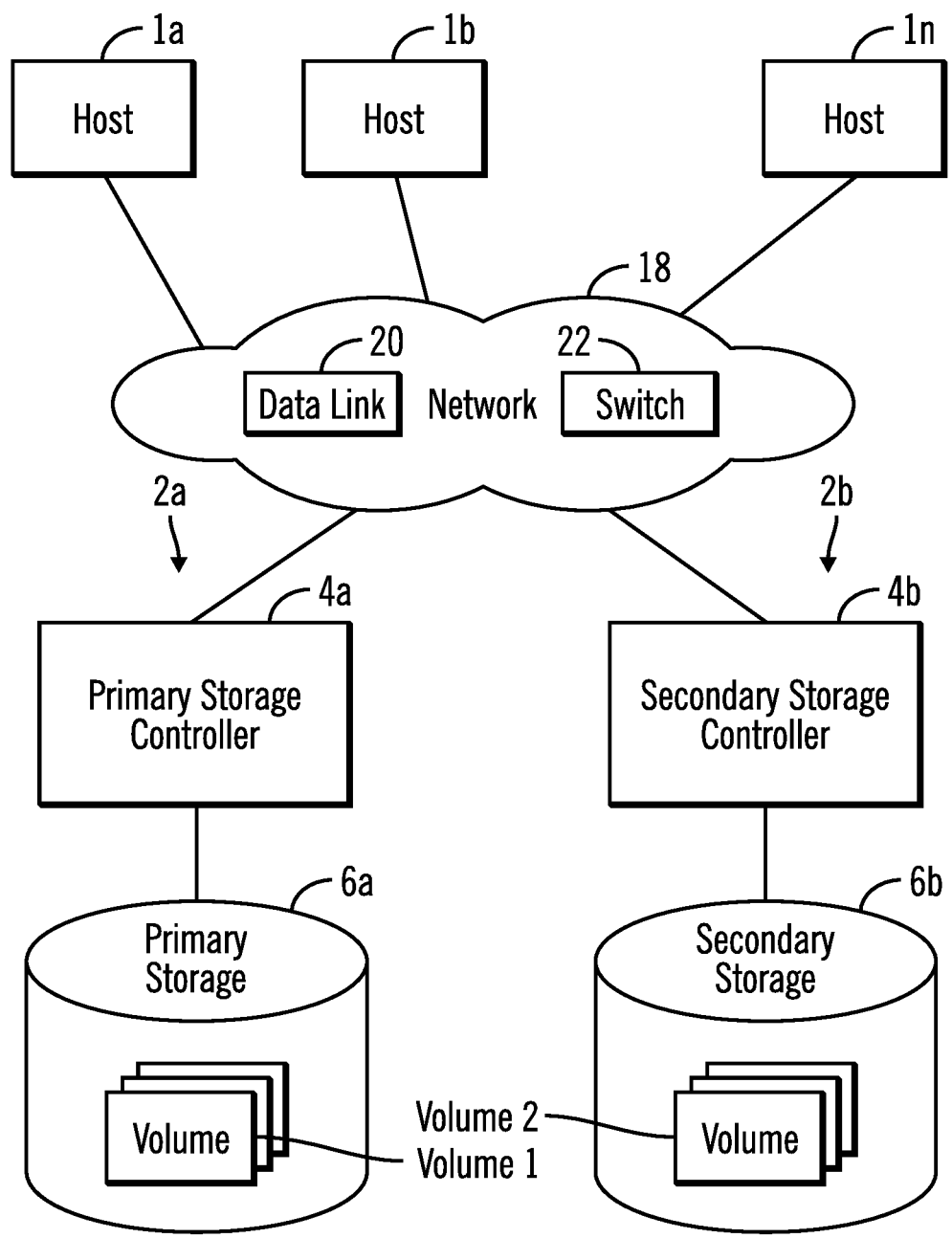
FIG. 1 illustrates an embodiment of a computing environment employing storage device status management in a data storage system in accordance with one aspect of the present description.

In the following description, reference is made to the accompanying drawings which form a part hereof and which illustrate several embodiments. It is understood that other embodiments may be utilized and structural and operational changes may be made.

Storage device status management in accordance with the present description provides a significant improvement in computer technology. In known data storage systems, a host has the ability to determine if a given volume is currently on-line to another host. However it is appreciated that in known data storage systems, a host does not have the ability to determine if that volume is not only on-line but also in use. For example, a host can direct a known command referred to as a "query host access" command to a storage controller controlling the storage unit storing a particular volume, to determine whether that volume is on-line, that is, whether that volume is already available to a host for operations such as I/O operations, for example. In response to such a known query host access command, a storage controller can report to the requesting host the on-line status of a volume. Some of the information returned by this command has been set by software, for example, and may include for example, the name of the on-line host and its host complex if any. However, known storage controllers do not report whether a volume is in use by a host. It is appreciated that such a situation can lead to conflicts with different hosts using programs targeting the same volume at the same time, each program changing characteristics of the target volume in a manner which may conflict with changes being made by another host.

In one aspect of storage device status management in accordance with the present description, a host can determine not only whether a particular volume is on-line with respect to another host, but also whether that volume is actually in use by another host. Accordingly, should one host determine that a volume is in use by another host, the one host can defer its use of the volume until the volume is no longer in use by another host. In this manner, conflicts which may lead to loss of data integrity may be reduced or eliminated, providing a significant improvement in computer technology.

As used herein, actual use of a volume by a host goes beyond merely being on-line with respect to the volume. One example of "in-use" is a host initiating functions directed to a volume that are "destructive" in the sense that, if they are performed by one host system while another host system is accessing the volume, data integrity may be compromised. For example, a host may initiate volume management operations of utility programs of the storage controller which provide functions that can change the characteristics of a target volume. Examples of such utility programs are programs which can create a new Volume Table of Contents (VTOC) on a target volume, move the VTOC, change the volume serial number of the target volume, etc. Other utility programs provide functions which can overwrite some or all of the existing data on a target volume such as a full volume copy or restore function, for example. Thus, if one host is initiating such utility programs directed to a volume while another host is accessing the same target volume, data integrity may be compromised.

In one aspect of the present description, a host using a volume causes in-use status information to be stored in the storage controller which controls the storage unit storing that volume. As a result, the storage controller possesses status information for each volume of the storage units controlled by that storage controller, which includes not only the on-line status of each volume but also the in-use status of each volume. Accordingly, prior to initiating use of a particular volume, a host can request the in-use status of that volume. If the requesting host determines that the volume is already in use by another host, the requesting host can defer its use of the volume until the volume is no longer in use by the other host. In this manner, conflicts which may lead to loss of data integrity may be reduced or eliminated, providing a significant improvement in computer technology.

Implementations of the described techniques may include hardware, a method or process, or computer software on a computer-accessible medium. A system of one or more computers may be configured for storage device status management in a data storage system in accordance with the present description, by virtue of having software, firmware, hardware, or a combination of them installed on the system that in operation causes or cause the system to perform storage device status management in accordance with the present description. For example, one or more computer programs may be configured to perform storage device status management in a data storage system by virtue of including instructions that, when executed by data processing apparatus, cause the apparatus to perform operations including one or more of host processor operations and storage controller processor operations.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence.

For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figures 2, 5:
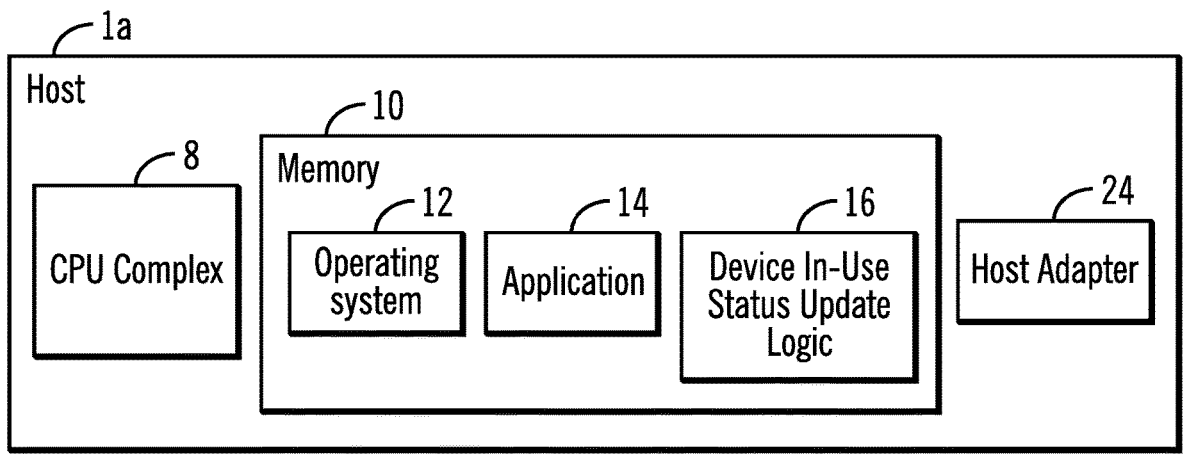
FIG. 2 illustrates an example of a host of the computing environment of FIG. 1.
FIG. 5 illustrates an example of a data structure maintained by a storage controller employing storage device status management in accordance with one aspect of the present description.
Figure 3:
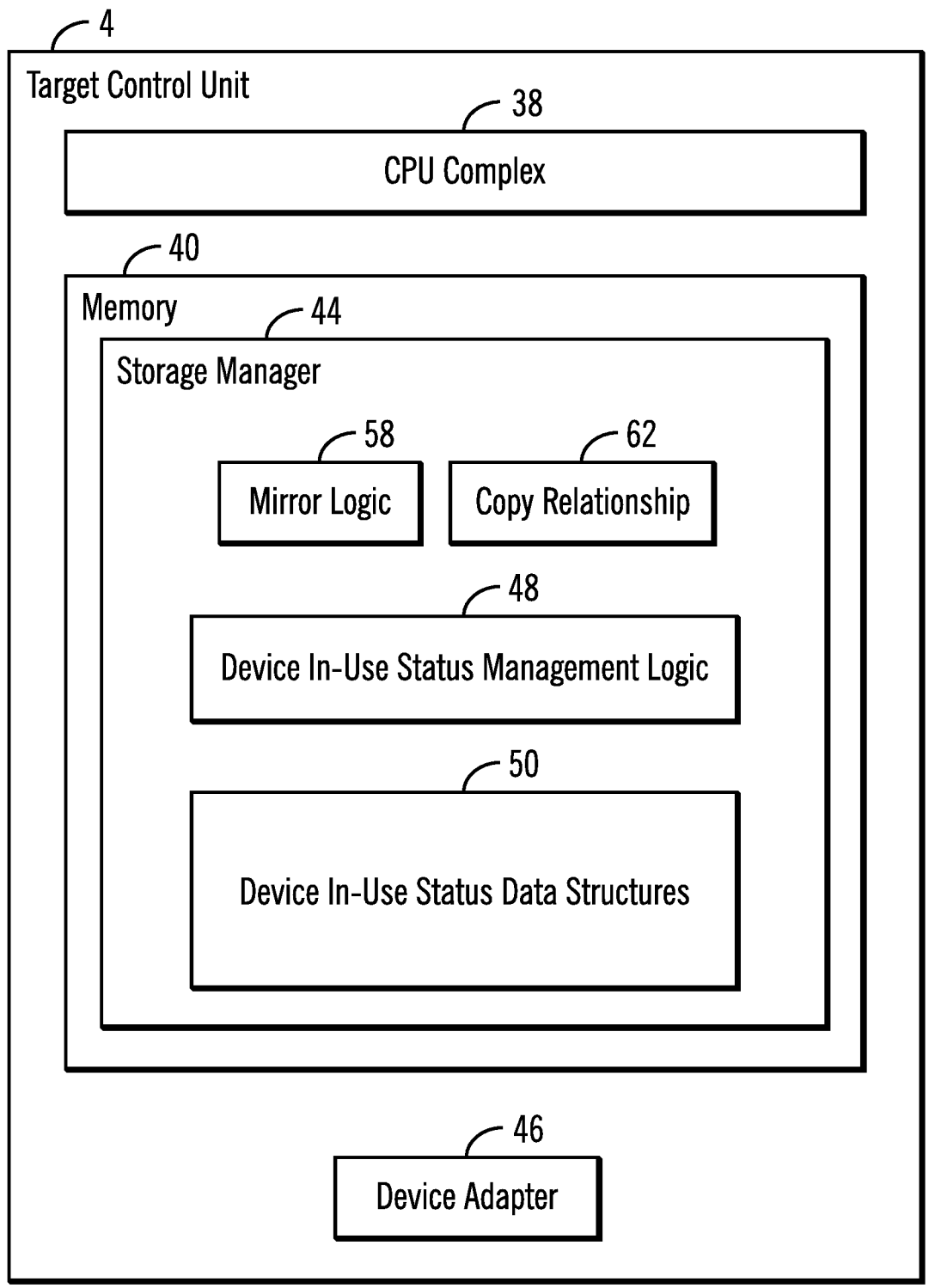
FIG. 3 illustrates an example of a storage controller of the computing environment of FIG. 1.

FIGS. 1-3 illustrate an embodiment of a computing environment employing storage device status management in a data storage system in accordance with the present description. A plurality of hosts 1a (FIGS. 1, 2), 1b . . . 1n may submit Input/Output (I/O) requests to one or more data storage devices or systems 2a, 2b, to read or write data. Each data storage system 2a, 2b includes a storage control unit or storage controller 4a, 4b, respectively, an example of which is shown in greater detail in FIG. 3 as storage controller 4a, which accesses user data and metadata stored in multiple data storage units of storage 6a, 6b, respectively.

The hosts 1a, 1b . . . 1n may be separate physical devices or may be virtual devices implemented using assigned resources of partitions of a server, for example. In a similar manner, the storage controllers 4a, 4b of the data storage systems 2a, 2b may be separate physical devices or may be virtual devices implemented using assigned resources of partitions one or more servers, for example.

In the illustrated embodiment, the data storage system 2a is a primary data storage system and the data storage system 2b is a secondary data storage system in which data stored on the primary data storage system 2a by a host is mirrored to the secondary data storage system 2b. Although the embodiment depicted in FIG. 1 depicts a single secondary data storage system 2b, it is appreciated that a primary data storage system 2a may have more than one secondary data storage system.

A typical host as represented by the host 1a of FIG. 2 includes a CPU complex 8 including one or more processors and a memory 10 having an operating system 12, an application 14 and device in-use status update logic 16 that updates the in-use status of I/O devices on-line with the host as described in greater detail below. The device in-use status update logic 16 may be implemented in software, hardware, firmware or any combination thereof. An example of a suitable operating system is the z/OS operating system. It is appreciated that other types of operating systems may be employed, depending upon the particular application.

The I/O requests to the data storage systems 2a, 2b may be transmitted over a network 18 (FIG. 1) which may include one or more data links 20 and switches 22 of a connection fabric to provide a connection path through the connection fabric between a selected host 1a, 1b . . . 1n and a selected target such as a data storage system 2a, 2b. The hosts are configured to initiate an I/O operation targeting a data storage system 2a, 2b, over a data link 20 (FIG. 1) of the connection fabric of the network 18. Each host 1a, 1b . . . 1n has one or more host adapters 24 (FIG. 2) which connects a host to a data link 20 and switch 22 of the network 18. The hosts and the data storage systems 2a, 2b communicate in accordance with the Fibre Channel Protocol (FCP), FICON or any other suitable protocol.

Thus, the system components 1a (FIG. 1), 1b . . . 1n, 4a, 4b, 6a, 6b, are connected to the network 18 which enables communication among these components. As noted above, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

The hosts 1a, 1b . . . 1n and the storage controllers 4a, 4b controlling storage devices 6a, 6b, may each comprise any suitable computational device including those presently known in the art, such as, a personal computer, a workstation, a server, a mainframe, a hand held computer, a palm top computer, a telephony device, a network appliance, a blade computer, a processing device, etc. The hosts 1a, 1b . . . 1n and the storage controllers 4a, 4b may be elements in any suitable network, such as, a storage area network, a wide area network, the Internet, an intranet. In certain embodiments, hosts 1a, 1b . . . 1n and the storage controllers 4a, 4b may be elements in a cloud computing environment.

It is appreciated that one or more data storage units of the storage 6a, 6b may comprise any suitable device capable of storing data in a nonvolatile manner, such as hard drives, solid state drives, tape drives, etc., known in the art. Thus, in one embodiment, the storage 6a, 6b may be comprised of one or more sequential access storage devices, such as hard disk drives and magnetic tape drives or may also include non-sequential access storage devices such as solid state drives (SSD), for example. Such additional devices of storage 6a, 6b may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 6a, 6b may also be other types of storage such as solid state drives in a RAID configuration to facilitate data recovery in the event of loss of a solid state drive. The storage units of the storage 6a, 6b may be configured to store data in subunits of data storage such as volumes, tracks, etc.

Each storage controller 4a, 4b of the illustrated embodiment, includes a CPU complex 38 (FIG. 3) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein. The CPU complex 8 of a host may have similar components.

Each storage controller 4a, 4b further has a memory 40 that includes a storage manager 44 configured to manage storage operations including writing data to or reading data from a storage unit of an associated storage 6a, 6b in response to an I/O data request from a host or mirrored data from another data storage system. Each storage controller 4a, 4b has one or more device adapters 46 (FIG. 3) which connect a storage controller to a data link 20 (FIG. 1) and switch 22 of the network 18. The storage manager 44 includes appropriate storage device drivers to configure associated storage 6a, 6b.

A channel path including one or more data links 20 (FIG. 1) and switches 22 of a connection fabric of the network 18 may logically connect a host adapter 24 (FIG. 2) of a host to a device adapter 46 (FIG. 3) of a storage controller 4a, 4b of an I/O device. A host 1a, 1b . . . 1n (FIG. 1) may be identified by a unique path group identification (ID). In order for a host to have access to a volume of the storage 6a, 6b (FIG. 1) and conduct I/O operations directed to that volume of an I/O device, in many systems, the host and the volume are logically "grouped" together. A host and a volume which have been grouped in this manner are considered to be "on-line" with respect to each other.

In one embodiment, the storage manager 44 is configured for selective grouping and ungrouping of hosts and volumes and sets of hosts and sets of volumes. Such grouping and ungrouping may be performed in response to user inputs through a suitable user interface, for example, or may be performed automatically in response to host or storage controller operations or commands, depending upon the particular application. It is appreciated that host and volume grouping and ungrouping operations may be performed using a variety of different processes, depending upon the particular application.

In one aspect of the present description, the storage controller 4a, 4b includes device in-use status management logic 48 which manages both on-line and in-use status information for volumes of the storage 6a or 6b controlled by the respective storage controller 4a, 4b. As explained in greater detail below, the device in-use status management logic 48 manages a device in-use status data structure of the data structures 50 which store both on-line and in-use status information for volumes of the storage 6a or 6b controlled by the storage controller. The device in-use status management logic 48 may be implemented in software, hardware, firmware or any combination thereof.

In one embodiment, a host using an on-line volume informs the device in-use status management logic 48 using a suitable command or message, for example, that the particular on-line volume is being used. In response, the device in-use status management logic 48 updates a device in-use status data structure 50 to indicate that the on-line volume is in use by that host. In a similar manner, a host completing use of an on-line volume informs the device in-use status management logic 48 using a suitable command or message, for example, that the particular on-line volume is no longer being used. In response, the device in-use status management logic 48 updates a device in-use status data structure of the data structures 50 to indicate that the on-line volume is in no longer being used.

In still another aspect of storage device status management in accordance with the present description, any host having access to a storage controller 4a, 4b can determine not only that a particular volume controlled by the storage controller has an on-line host, but also whether that volume is currently being used by the on-line host. In this manner, conflicts which might otherwise arise by more than one host using a volume at a time, may be reduced or eliminated. As a result, data integrity may be maintained and system performance improved. Moreover, hosts need not be on-line to determine the in-use status of a volume. Such widespread availability of volume in-use status information to both on-line and off-line hosts also significantly reduces the potential for conflict and therefore improves data integrity.

The CPU complex 38 of each storage controller 4a, 4b may have multiple clusters of processors, each cluster having its own assigned memory 40, storage manager 44, cache, etc. The processing and memory resources assigned each cluster may be physical, virtual, shared, transferrable or dedicated, depending upon the particular application.

In the illustrated embodiment, the storage manager 44 includes mirror logic 58 that is configured to execute in the primary storage controller 4a (FIG. 1) and perform copy operations to copy tracks or other portions of storage volumes from the primary storage controller 4a to the secondary storage controller 4b in a consistent manner. For example, a primary-secondary pair of volumes, volume 1, volume 2 are in an asynchronous copy or mirror relationship 62 such that updates to the primary volume 1 are asynchronously mirrored to each secondary volume 2.

In the illustrated embodiment, a copy relationship is represented by a data structure as represented by the copy relationships 62 of the memory 40 of FIG. 3. Thus, one or more copy relationships 62, which may be maintained by the mirror logic 58 for the primary and secondary storage controllers 4a, 4b, (FIG. 1) associate primary storage locations in the primary storage 6a and corresponding secondary storage locations in each of the secondary storage drives as represented by the storage 6b of the mirror relationship, such that updates to locations of the primary storage 6a are mirrored, that is, copied to the corresponding locations of the secondary storage 6b. For example, source storage locations in a primary storage volume 1 (FIG. 1) of storage 6a may be asynchronously mirrored in a mirror operation to target storage locations of a secondary volume 2 of the storage 6b pursuant to a mirror copy relationship 62 (FIG. 3). Similarly, source storage locations in the primary storage volume 1 (FIG. 1) of storage 6a may be asynchronously mirrored in a mirror operation to additional target storage locations of another secondary volume 2 of another secondary data storage system pursuant to a mirror copy relationship 62 (FIG. 3).

In the illustrated embodiment, a copy relationship of the copy relationships 62 comprises an asynchronous mirror relationship for a pair of storage locations in which updates to the primary (source) storage locations of the mirror relationship 62 are asynchronously mirrored to the secondary (target) storage locations of the mirror relationship 62. It is appreciated that other types of copy relationships such as synchronous, for example, may be established, depending upon the particular application.

Figure 4:
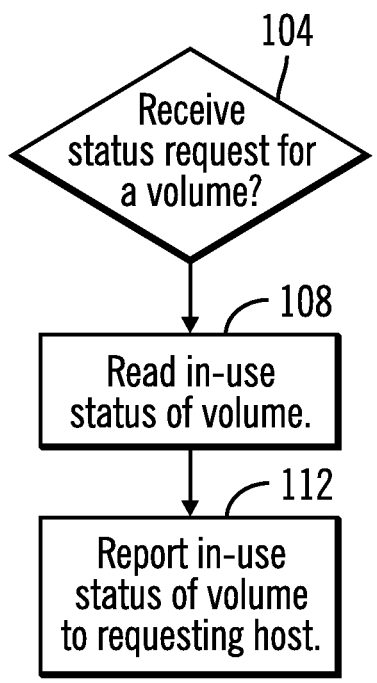
FIG. 4 illustrates an example of operations of a storage controller employing storage device status management in accordance with one aspect of the present description.

FIG. 4 depicts one example of operations of the storage manager 44 of a storage controller 4a, 4b performing storage device in-use status management in accordance with the present description. In response to receipt (block 104, FIG. 4) of a status request from a host concerning the in-use status of a volume controlled by the storage controller 4a, for example, the device in-use status management logic 48 is configured to read (block 108, FIG. 4) the device in-use status data structures 50 (FIG. 3) maintained by the device in-use status management logic 48, and report (block 112, FIG. 4) to the requesting host, the in-use status of the particular volume. If the report indicates that the specified volume is in use, in one embodiment, the report may identify the host by path group ID, for example, which is currently using the specified volume. In one embodiment, if the report indicates that the specified volume is not in use, the report may further identify any on-line host by path group ID, for example, which is currently on-line with respect to the specified volume. If the specified volume is currently off-line to all hosts, such status information may be reported as well in one embodiment. In this manner, a host may issue an in-use status request for one or more volumes prior to initiating use of those volumes itself. Thus, if the report received in response to the in-use status request indicates that a volume is currently in use by another host, the requesting host can defer usage of the volume until the volume is no longer currently being used by another host. In this manner, conflicts which may lead to loss or corruption of data may be reduced or eliminated.

Conversely, if the report received in response to the in-use status request indicates that a volume is not currently in use by another host, the requesting host can initiate usage of the volume immediately without delay since it is assured that the volume is not currently being used by another host. In this manner, performance may be improved while minimizing conflicts which may lead to loss or corruption of data.

FIG. 5 shows an example of a device in-use status data structure 50a which has been allocated for a volume, volume 1 (FIG. 1) in this example. In this example, the device in-use status data structure 50a includes a field designated "Volume ID" which identifies the volume, volume 1 in this example, to which the device in-use status data structure 50a pertains. For the volume identified as volume 1, the device in-use status data structure 50a further includes a field designated "Host ID" which identifies by path group ID in this example, the host or hosts which are currently grouped with volume 1, a field designated "On-line Status" which identifies whether a particular host of the "Host ID" field is currently on-line or off-line, and a field designated "In-Use Status" which identifies whether the volume 1 is currently in-use by the host identified by the associated "Host ID" field or is currently not in-use by that host.

In the example of FIG. 5, the host 1a (FIG. 1) identified by the path group ID "HostID_1a" is indicated as both on-line with respect to the volume 1 and also currently using volume 1 as indicated by the "On-line Status" and "In-Use Status" fields, respectively. Further, in the example of FIG. 5, the host 1n (FIG. 1) identified by the path group ID "HostID_1n" is indicated as both not using volume 1 as indicated by the "In-Use Status" field, and also as off-line with respect to the volume 1 as indicated by the "On-line Status" field. Still further, in the example of FIG. 5, the host 1b (FIG. 1) identified by the path group ID "HostID_1b" is indicated as on-line with respect to the volume 1 but not currently using volume 1 as indicated by the "On-line Status" and "In-Use Status" fields, respectively.

Accordingly, in response to a host request (block 104, FIG. 4) for an in-use status report for volume 1, the device in-use status data structure 50a (FIG. 5) may be read (block 108, FIG. 4) by the storage controller 4a, and the in-use status reported in one embodiment, as currently being used by host 1a (identified by path group ID "HostID-1a). It is appreciated that in some embodiments, additional information from a device in-use status data structure such as the device in-use status data structure 50a for volume 1 may be reported as well. For example, it may be reported that volume 1 is currently on-line with but not currently in use by host 1b as identified by path group ID, HostID_1b, or that volume 1 is currently off-line with and therefore is not currently in use by host 1n as identified by path group ID, HostID_1n. Other types and combinations of in-use status information may be provided depending upon the particular application. For example, names of the hosts 1a, 1b, ln may be provided and the names of any host complexes of which the hosts 1a, 1b are a part.

In the example of FIG. 5, the device in-use status data structure 50a is represented in an array format which includes row and columns, each row pertaining to a particular host and each column pertaining to a particular identification or status field. It is appreciated that other formats may be used, depending upon the particular application.

As noted above, a requesting host need not be on-line with respect to the volume or volumes which are the subject of the in-use status request. Instead, any host having access to the storage controller 4a, 4b may request in-use status information for any volume controlled by the storage controller, whether or not the requesting host is on-line with respect of any of the volumes of the in-use status request. As a result, the in-use status information of the volumes is widely available to the hosts of the system which further improves system performance while minimizing conflicts.

Although the in-use status request and responding report is described above in connection with a volume such as volume 1, for example, it is appreciated that a host may request and receive the in-use status information for multiple volumes controlled by the storage controller 4a, depending upon the particular application. It is further appreciated that a host may request and receive the in-use status information for other types of units of storage controlled by the storage controller 4a, such as tracks, segments, logical units, etc. depending upon the particular application.

Figure 6:
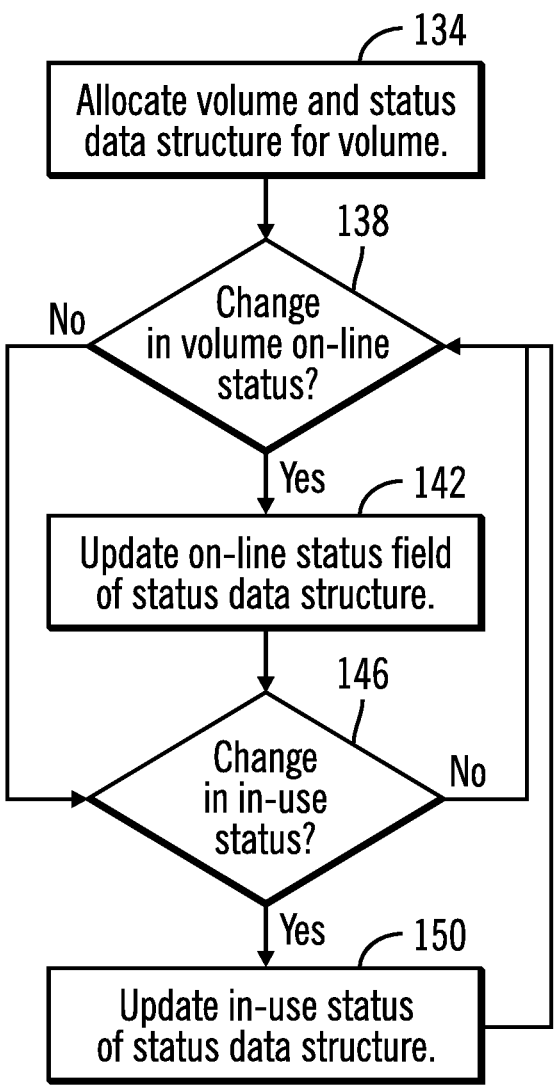
FIG. 6 illustrates another example of operations of a storage controller employing storage device status management in accordance with one aspect of the present description.

FIG. 6 depicts another example of operations of the storage manager 44 performing in-use status management in accordance with the present description. In this example, a unit of data storage such as a volume is allocated (block 134, FIG. 5) from data storage space of storage 6a, 6b controlled by the storage controller. In addition, a device in-use status data structure of the data structures 50 is allocated by the device in-use status management logic 48. Thus, in the example of FIG. 5, in connection with the allocation (block 134, FIG. 5) of volume 1 from data storage space of storage 6a, 6b controlled by the storage controller, the device in-use status data structure 50a (FIG. 5) of the data structures 50 (FIG. 3) is allocated.

The device in-use status management logic 48 is configured to detect (block 138, FIG. 6) a change in the on-line status of each volume which has been allocated in the storage controlled by the storage controller such as storage controller 4a, for example. In response to a detection (block 138, FIG. 6) of a change in the on-line status of a particular volume, an on-line status field of the associated device in-use status data structure 50 is updated (block 142, FIG. 6). Thus, in the example of FIG. 5 depicting the device in-use status data structure 50a for volume 1, in response to a detection (block 138, FIG. 6) that the host 1a as identified by the path group ID, HostID_1a, has gone on-line with volume 1, the "On-line Status" field associated with the host 1a is updated (block 142, FIG. 6) to indicate that the host 1a as identified by the path group ID, HostID_1a, is currently on-line with volume 1 as shown in FIG. 5. Similarly, in response to a detection (block 138, FIG. 6) that the host 1b as identified by the path group ID, HostID_1b, has gone on-line with volume 1, the "On-line Status" field associated with the host 1b is updated (block 142, FIG. 6) to indicate that the host 1b as identified by the path group ID, HostID_1b, is currently on-line with volume 1. Conversely, in response to a detection (block 138, FIG. 6) that the host 1n as identified by the path group ID, HostID_1n, has gone off-line with volume 1, the "On-line Status" field associated with the host 1n is updated (block 142, FIG. 6) to indicate that the host 1n as identified by the path group ID, HostID_1n, is currently off-line with volume 1.

In one embodiment, a "row" of entries of the device in-use status data structure 50a may be added for each new host as that new host goes on-line with respect to the volume of the data structure 50a. Conversely, in some embodiments, a "row" of entries of the device in-use status data structure 50a may be deleted from the data structure 50a if the host of that row goes off-line with respect to the volume of the data structure 50a. Alternatively, in some embodiments, a "row" of entries of the device in-use status data structure 50a may be maintained in the data structure 50a for a host notwithstanding that the host of that row goes off-line with respect to the volume of the data structure 50a. Thus, in the example of FIG. 5, the row of entries for the host 1n as identified by the path group ID HostID_1n is retained when the host 1n goes off-line with respect to volume 1 but the data structure 50a is updated to indicate the off-line status of the host 1n with respect to the volume 1.

As noted above, the device in-use status management logic 48 is configured to detect (block 138, FIG. 6) a change in the on-line status of each volume which has been allocated in the storage controlled by the particular storage controller 4a, 4b. In one embodiment, the on-line status of a host with respect to a volume may be changed by the storage manager 44 grouping or ungrouping the group path ID of a host with a particular volume. Such grouping and ungrouping may be performed in response to user inputs through a suitable user interface, for example, or may be performed automatically in response to host or storage controller operations or commands, depending upon the particular application. Thus, grouping a host path group ID with a particular volume changes the on-line status of the host with respect to that volume from off-line to on-line. Conversely, ungrouping a host path group ID from a particular volume changes the on-line status of the host with respect to that volume from on-line back to off-line. The device in-use status management logic 48 is configured to detect (block 138, FIG. 6) such grouping and ungrouping of hosts with respect to volumes and thus detect changes in the on-line status of each volume which has been allocated in the storage controlled by the storage controller. It is appreciated that host and volume grouping and ungrouping operations may be performed using a variety of different processes, depending upon the particular application.

The device in-use status management logic 48 is further configured to detect (block 146, FIG. 6) a change in the in-use status of each volume which has been allocated in the storage controlled by the storage controller 4a, 4b. In one embodiment, the device in-use status management logic 48 is configured to detect (block 146, FIG. 6) a change in the in-use status of a volume in response to an instruction or other message from a host as described in greater detail below in connection with FIG. 7. Accordingly, when a host which is on-line with respect to a volume is ready to begin actual use of the on-line volume, the host may send a suitable instruction or update message to the storage controller 4a, 4b informing the storage controller that an identified volume on-line to that host is currently in use by that host.

In response to the received message or instruction from the host using the volume, the device in-use status management logic 48 updates (block 150, FIG. 6) the in-use status of the particular volume to indicate that the volume is in-use or in-use by a particular host. Similarly, when a host which is using a volume on-line to the host is ready to terminate actual use of the on-line volume, the host may send a suitable instruction or update message to the storage controller 4a, 4b informing the storage controller that an identified volume on-line to that host is currently no longer in use by that host. In response to the received message or instruction from the host terminating use, the device in-use status management logic 48 updates (block 150, FIG. 6) the in-use status of the particular volume to indicate that the volume is no longer in-use or is not in-use by that particular host.

It is appreciated that the device in-use status management logic 48 may be configured to detect (block 146, FIG. 6) a change in the in-use status of a volume in response to activities of the storage controller itself. For example, in one embodiment, the device in-use status management logic 48 may snoop host I/O operations or volume management operations for example, which have been directed to volumes controlled by the storage controller, to detect that a volume is in use. Other techniques and processes may be used to detect a change in the in-use status of a volume, depending upon the particular application.

As noted above, in response to a detection (block 146, FIG. 6) of a change in the in-use status of a particular volume, an in-use status field of the associated device in-use status data structure is updated (block 150, FIG. 6). Thus, in the example of FIG. 5 depicting the device in-use status data structure 50a for volume 1, in response to a detection (block 146, FIG. 6) that the host 1b as identified by the path group ID, HostID_1b, is no longer using volume 1, the "In-Use Status" field associated with the host 1b is updated (block 150, FIG. 6) to indicate that the host 1b as identified by the path group ID, HostID_1b, although currently on-line with volume 1, is no longer using volume 1. Similarly, in response to a detection (block 146, FIG. 6) that the host 1a as identified by the path group ID, HostID_1a, is currently using volume 1, the "In-Use Status" field associated with the host 1a is updated (block 150, FIG. 6) to indicate that the host 1a as identified by the path group ID, HostID_1a, is currently using volume 1 as shown in FIG. 5.

In another example, when it was detected (block 138, FIG. 6) that the host 1n as identified by the path group ID, HostID_1n, had gone off-line with volume 1, it is automatically detected (block 146, FIG. 6) that the host 1n was no longer using volume 1, and the "In-Use Status" field associated with the host 1n may be updated (block 150, FIG. 6) as well to indicate that the host 1b as identified by the path group ID, HostID_1b, is not currently using volume 1. However, it is appreciated that in some embodiments, an "On-Line Status" field which indicates that a particular host is off-line with respect to the volume, may also be used to indicate that the off-line host is not using the volume as well.

It is further appreciated that in some embodiments, a data structure for a volume may have a single entry "In-Use Status" field which indicates merely whether the volume is in use or not. For example, in some embodiments, the device in-use data structure may not indicate which host is using the volume but merely that the volume is in use by an unidentified host. Alternatively, the particular host which is currently using the volume may be indicated by the device-in-use data structure as illustrated by the example of FIG. 5.

Figure 7:
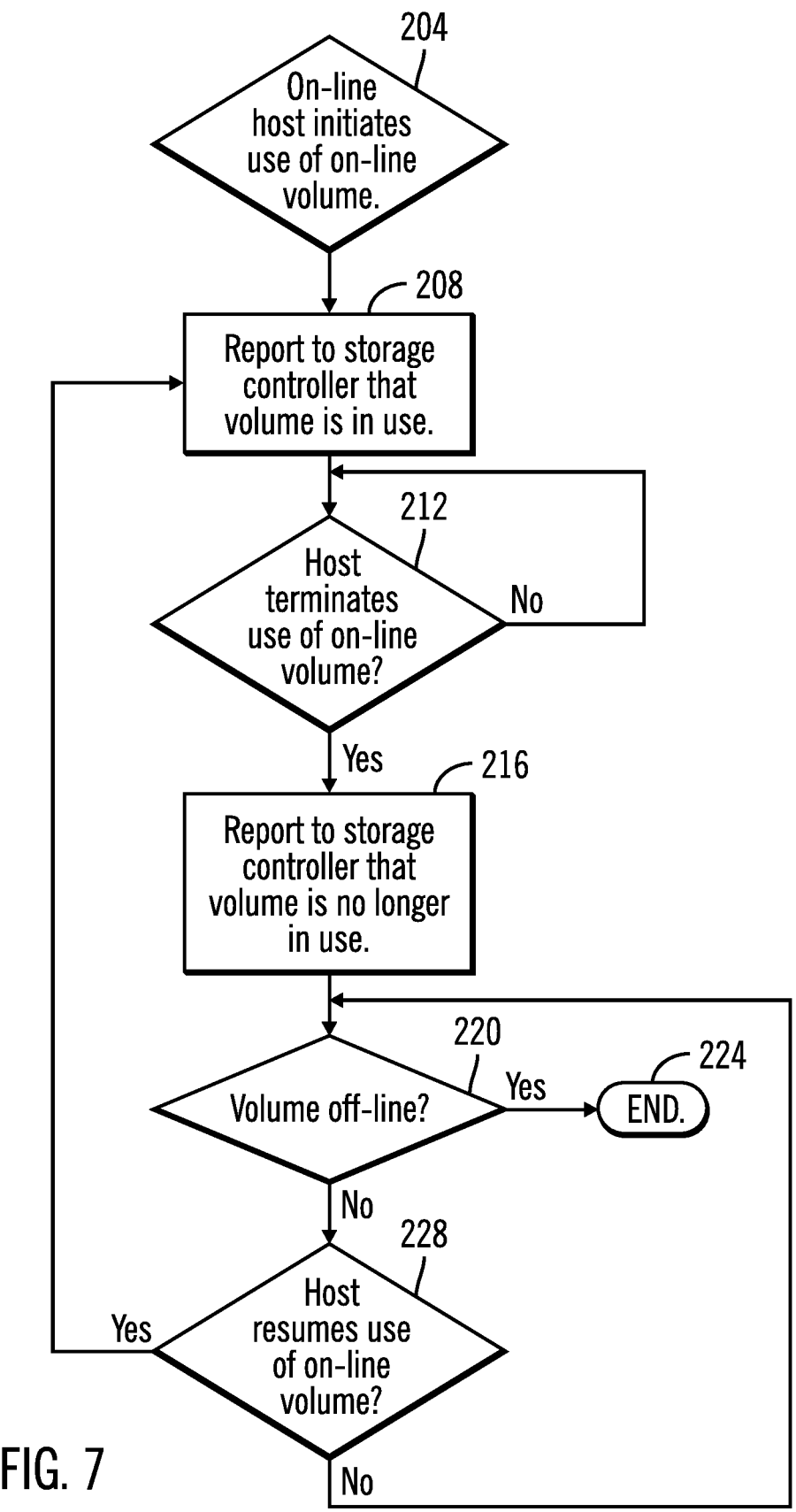
FIG. 7 illustrates an example of operations of a host employing storage device status management in accordance with one aspect of the present description.

FIG. 7 depicts an example of operations of a host performing in-use status management in accordance with the present description. In this example, the host initiates use of a volume which is on-line with respect to the host. As used herein, actual use of a volume by a host goes beyond merely being on-line with respect to the volume. One category of "in-use" is a host initiating functions directed to a volume that are "destructive" in the sense that, if they are performed by one host system while another host system is accessing the volume, data integrity may be compromised. For example, a host may initiate volume management operations of utility programs of the storage controller which provide functions that can change the characteristics of a target volume. Examples of such utility programs are programs which can create a new Volume Table of Contents (VTOC) on a target volume, move the VTOC, change the volume serial number of the target volume, etc. Other utility programs provide functions which can overwrite some or all of the existing data on a target volume such as a full volume copy or restore function, for example. Thus, if one host is initiating such utility programs directed to a volume while another host is accessing the same target volume, data integrity may be compromised.

As another example, if a first host is copying a volume over to another target volume on-line to the first host, while a second on-line host is writing data to the same target volume, write I/O operations by the second host may continue until the data set of the target volume needs to extend. Once the data set needs to extend, the write operation by the second host is likely to encounter an abnormal ending such as an abort. The physical space of the storage being written to by the second host may, due to the abnormal ending of the write I/O operation, become free space or space assigned to the same or different data set that may no longer represent the data on the target volume due to the actions of the first host.

In order to reduce or eliminate such data integrity issues, the device in-use status update logic 16 (FIG. 2) of an on-line host is configured to detect (block 204) that the host is initiating use of an on-line target volume. The device in-use status update logic 16 (FIG. 2) is further configured to, in response to detection (block 204, FIG. 7) of the initiation of use of the target volume, report (block 208, FIG. 7) to the storage controller 4a, 4b that the target volume is in use by the host. In response to the in-use report from the host, the device in-use status management logic 48 (FIG. 3)

of the storage controller updates the associated device in-use data structure 50 as described above in connection with FIGS. 4 and 5, to indicate that the target volume is in use by that host. Thus, if the host initiating use of a target volume is the host 1a, for example, and the target volume being put into use by the host 1a is the volume 1, the in-use status field for the host 1a as identified by the path group ID, HostID_1a, is updated by the storage controller to indicate the "in-use" status as shown in FIG. 5.

In one embodiment, the device in use data structure 50 for each volume may have a further field which indicates the type of use if the volume is being used by a host. In such embodiments, the device in-use status update logic 16 (FIG. 2) may be configured to, in response to detection (block 204, FIG. 7) of the initiation of use of the target volume, report (block 208, FIG. 7) to the storage controller 4a, 4b not only that the target volume is in use by the host but may also report the type of use. For example, the device in-use status update logic 16 (FIG. 2) of the host may report whether the use by the reporting host is the "destructive" type such that, if another host should start accessing the volume while the reporting host is in the process of using the volume in the destructive type of use, data integrity may be compromised. Another example of a type of use that may be reported is a non-destructive type such as a pure read operation, for example, such that, if another host should start accessing the volume in a read operation while the reporting host is in the process of using the volume in a non-destructive read type of use, data integrity is less likely to be compromised.

In response to an in-use report from the reporting host which includes the type of use by the host, the device in-use status management logic 48 (FIG. 3) of the storage controller updates the associated device in use data structure 50 as described above in connection with FIGS. 4 and 5, to indicate not only that the target volume is in use by that host but also to indicate the type of use by that host.

The device in-use status update logic 16 (FIG. 2) of the host using a target volume, is further configured to detect (block 212) that a host is terminating use of a target volume. In response to detection of the termination of a target volume, the device in-use status update logic 16 (FIG. 2) of the host terminating use of a target volume is further configured to report (block 216, FIG. 7) to the storage controller 4a, 4b that the target volume is no longer in use by the host. In response to the no longer in-use report from the host, the device in-use status management logic 48 (FIG. 3) of the storage controller updates the associated device in-use data structure 50 as described above in connection with FIGS. 4 and 5, to indicate that the target volume is no longer in use by that host. Thus, if the host terminating use was the host 1b, for example, and the use being terminated was use of the volume 1, the in-use status field for the host 1b as identified by the path group ID, HostID_1b, is updated to indicate the "not in-use" status as shown in the device in-use status data structure 50a (FIG. 5) for the target volume 1.

The device in-use status update logic 16 (FIG. 2) of the host using a target volume, is further configured to detect (block 220) whether the host has gone off-line with respect to a volume. If so, the operations of FIG. 7 end (block 224, FIG. 7) with respect to that volume. In some embodiments, the device in-use status update logic 16 (FIG. 2) may report to the storage controller the off-line status of the host with respect to the volume. In other embodiments, the storage controller may independently determine (block 138, FIG. 6) that the host has gone off-line with respect to the volume.

If the host remains on-line with respect to the volume, the device in-use status update logic 16 (FIG. 2) of an on-line host is configured to detect (block 228, FIG. 7) whether that the host is resuming use of an on-line target volume. If so, the device in-use status update logic 16 reports (block 208) that the volume is again in use as described above. If use is not resumed, the device in-use status update logic 16 continues to monitor (block 220) whether the host has gone off-line with respect to the volume.

Figure 8:
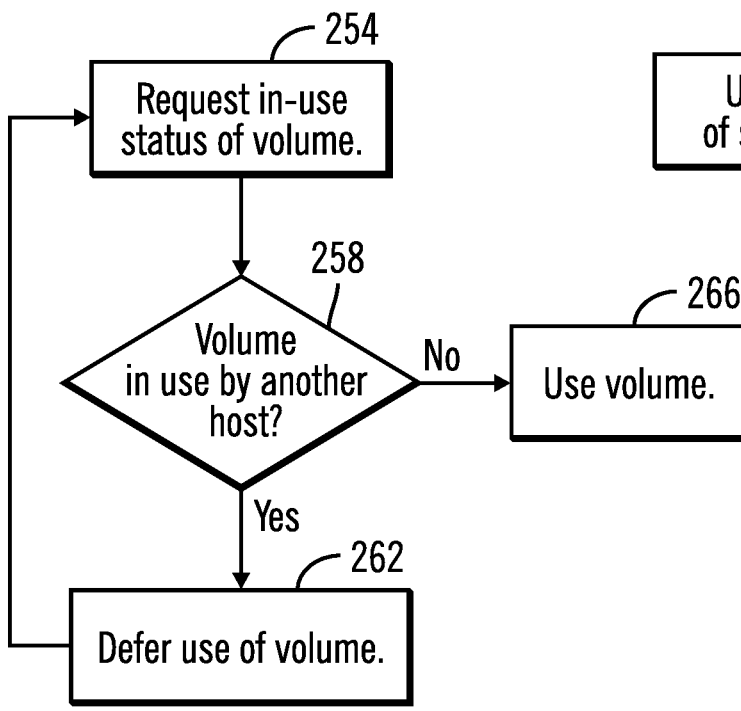
FIG. 8 illustrates another example of operations of a host employing storage device status management in accordance with one aspect of the present description.

FIG. 8 depicts another example of operations of a host performing in-use status management in accordance with the present description. In this example, prior to a host initiating use of a volume, the device in-use status update logic 16 (FIG. 2) of that host is configured to request (block 254, FIG. 8) from the storage controller controlling that volume, the in-use status of that volume. Upon receipt of the in-use report, the device in-use status update logic 16 (FIG. 2) of the requesting host is configured to determine (block 258, FIG. 8) based upon the received in-use report, whether the volume is already in use by another host. If so, the device in-use status update logic 16 (FIG. 2) causes the requesting host to defer (block 262, FIG. 8) the planned use of the volume.

For example, prior to the host 1b initiating use of the volume 1, the device in-use status update logic 16 (FIG. 2) of the host 1b is configured to request (block 254, FIG. 8) from the storage controller 4a controlling that volume 1, the in-use status of that volume. As shown in FIG. 5, the requested in-use status report based upon the device in-use data structure 50a (FIG. 5) will indicate that the volume 1 is currently in use by the host 1a as identified by the Host ID, HostID_1a. Upon receipt of the in-use report, the device in-use status update logic 16 (FIG. 2) of the requesting host 1b determines (block 258, FIG. 8) based upon the received in-use report, that the volume 1 is already in use by another host which in some embodiments may be identified as the HostID_1a, for example. If so, the device in-use status update logic 16 (FIG. 2) of the requesting host 1b causes the requesting host 1b to defer (block 262, FIG. 8) the planned use of the volume 1.

In one embodiment, the device in-use status update logic 16 (FIG. 2) of the requesting host may periodically request (block 254, FIG. 8) further in-use status reports until it is determined (block 258, FIG. 8) that the volume is no longer in use by another host. Once it is determined (block 258, FIG. 8) that the volume is no longer in use by another host, the device in-use status update logic 16 (FIG. 2) permits the requesting host to proceed to use (block 266, FIG. 8) the volume in the planned use of the volume. In this manner, data integrity issues caused by more than one host using a volume at the same time may be reduced or eliminated.

In one embodiment, the in-use status report received by the requesting host may also include the type of use if the volume of the in-use status request is in use. If so, the device in-use status update logic 16 (FIG. 2) of the requesting host may be configured to determine (block 258, FIG. 8) based upon the received in-use report, whether the volume is already in use in a destructive type of use by another host. If it is determined that the volume is in use but in a non-destructive type of use, for example, the requesting host may proceed to use (block 266, FIG. 8) the volume in another non-destructive type of use such as a pure read operation, for example, without adversely affecting data integrity.

It is seen from the above, that storage device status management in accordance with the present description improves computer technology. For example, data integrity is improved by reducing or eliminating conflicting uses of a volume by different hosts. System performance is improved by avoiding compromises to data integrity. It is appreciated that other improvements to computer technology by may realized in a computer system employing storage device status management in accordance with the present description, depending upon the particular application.

Figure 9:
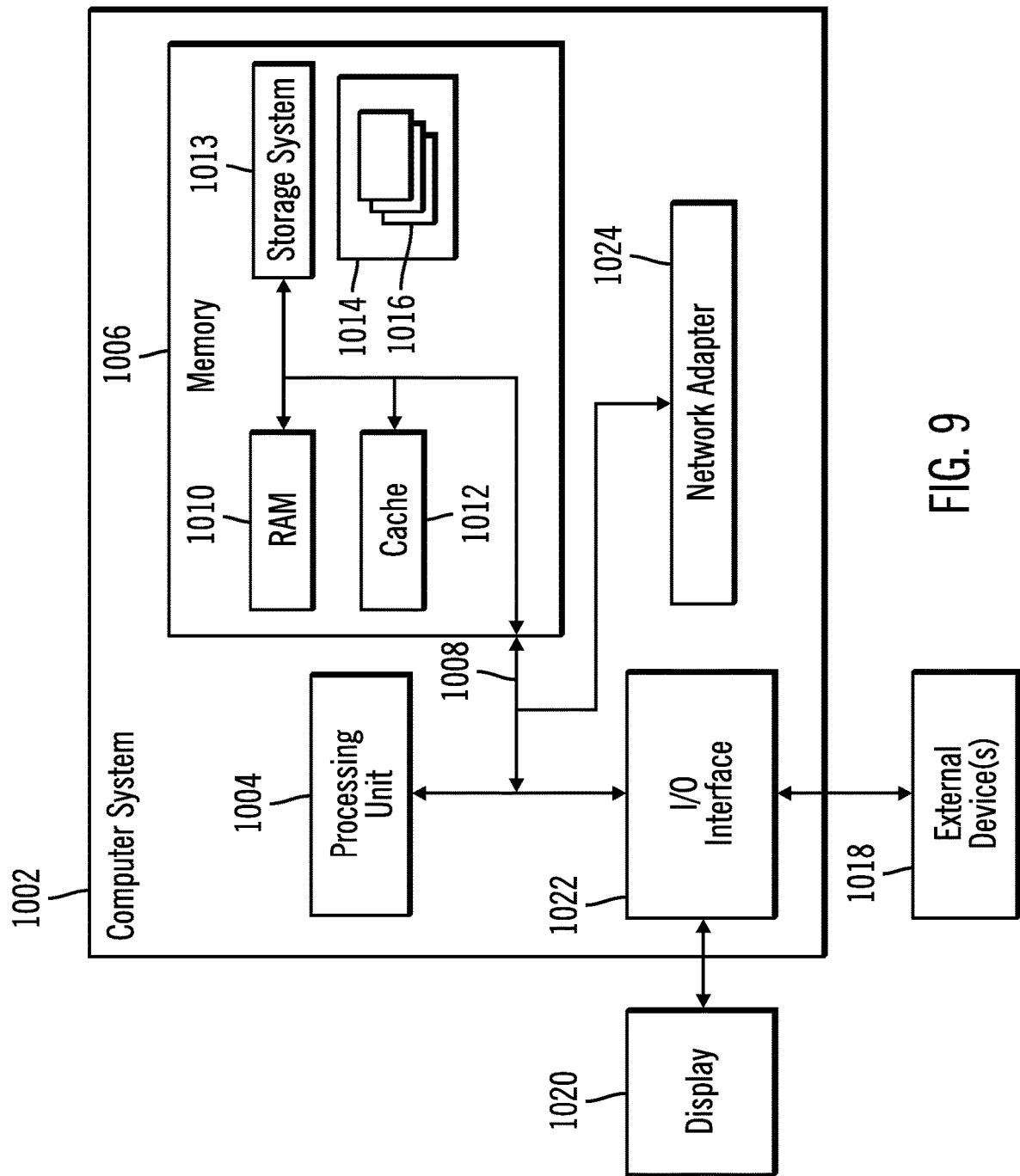
FIG. 9 illustrates another computer embodiment employing storage device status management in a data storage system in accordance with the present description.

The computational components of the figures may each be implemented in one or more computer systems, such as the computer system 1002 shown in FIG. 9. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

The computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with a first host and a data storage system having a storage controller and at least one storage unit controlled by the storage controller, wherein the storage controller has a processor, and wherein the computer program product comprises a computer readable storage medium having program instructions embodied therewith, the program instructions executable by a processor of the storage controller to cause storage controller processor operations, the storage controller processor operations comprising:
   receiving from the first host, a volume status request for a volume of a storage unit controlled by the storage controller; and
   in response to the status request, returning a volume status report indicating whether the volume is in use by a host wherein use by a host includes changing the volume.

2. The computer program product of claim 1 wherein the volume status report further indicates identity of a host using the volume if the volume is in use by a host.

3. The computer program product of claim 1 wherein the volume status report further indicates whether the volume is on-line to a host and if so, further identifies a host to which the volume is on-line.

4. The computer program product of claim 1 wherein the storage controller processor operations further comprise:
   in response to ungrouping the volume and a host, updating an on-line status field of a status data structure for the volume indicating that the volume is off-line with respect to a host of the ungrouping; and
   updating an in-use status field of the status data structure for the volume indicating that the volume is not in use by a host of the ungrouping.

5. The computer program product of claim 1 wherein the storage controller processor operations further comprise:
   in response to grouping the volume of the storage unit and a second host having a path group ID unique to the second host, updating an on-line status field of a status data structure for the volume of the grouping to indicate that the volume is on-line to the second host of the grouping, and
   in response to ungrouping the volume and the second host of the grouping, the storage controller updating the on-line status field of the status data structure for the volume of the ungrouping to indicate that the volume is off-line to the second host of the ungrouping.

6. The computer program product of claim 1 wherein a second host has a processor, and wherein the computer program product further comprises a further computer readable storage medium having further program instructions embodied therewith, the further program instructions executable by a processor of the second host to cause second host processor operations, the second host processor operations comprising:
   using the volume which has been grouped with the second host; and
   indicating to the storage controller that the volume is in use; and
   wherein the storage controller processor operations further comprise:
   in response to the second host indicating that the volume is in use, updating an in-use status field of a status data structure for the volume indicating that the volume is in use.

7. The computer program product of claim 6 wherein the second host processor operations further comprise:
   terminating the use of the volume; and
   indicating to the storage controller that the volume is no longer in use; and
   wherein the storage controller processor operations further comprise:
   in response to the second host indicating that the volume is no longer in use, updating the in-use status field of the status data structure for the volume indicating that the volume is not in use.

8. The computer program product of claim 1 wherein the first host has a processor, and wherein the computer program product further comprises a further computer readable storage medium having further program instructions embodied therewith, the further program instructions executable by a processor of the first host to cause first host processor operations, the first host processor operations comprising:
   in response to a volume status report indicating that the volume is in use by another host, deferring use of the volume by the first host until the volume is indicated by a volume status report to no longer be in use.

9. The computer program product of claim 1 wherein use by a host includes a use which would conflict with use of the volume by another host.

10. A method, comprising:
    receiving from a first host, a volume status request for a volume of a storage unit controlled by the storage controller; and
    in response to the status request, returning a volume status report indicating whether the volume is in use by a host wherein use by a host includes changing the volume.

11. The method of claim 10 wherein the volume status report further indicates identity of a host using the volume if the volume is in use by a host.

12. The method of claim 10 wherein the volume status report further indicates whether the volume is on-line to a host and if so, further identifies a host to which the volume is on-line.

13. The method of claim 10 further comprising:
    in response to ungrouping the volume and a host, updating an on-line status field of a status data structure for the volume indicating that the volume is off-line with respect to a host of the ungrouping; and
    updating an in-use status field of the status data structure for the volume indicating that the volume is not in use by a host of the ungrouping.

14. The method of claim 10 further comprising:
    in response to grouping the volume of the storage unit and a second host having a path group ID unique to the second host, updating an on-line status field of a status data structure for the volume of the grouping to indicate that the volume is on-line to the second host of the grouping, and in response to ungrouping the volume and the second host of the grouping, updating the on-line status field of the status data structure for the volume of the ungrouping to indicate that the volume is off-line to the second host of the ungrouping.

15. The method of claim 10 further comprising:

a second host using the volume which has been grouped with the second host;

the second host indicating to the storage controller that the volume is in use; and the storage controller in response to the second host indicating that the volume is in use, updating an in-use status field of a status data structure for the volume indicating that the volume is in use.

16. The method of claim 15 further comprising:

the second host terminating the use of the volume;

the second host indicating to the storage controller that the volume is no longer in use; and the storage controller, in response to the second host indicating that the volume is no longer in use, updating the in-use status field of the status data structure for the volume indicating that the volume is not in use.

17. The method of claim 10 further comprising:

the first host in response to a volume status report indicating that the volume is in use by another host, deferring use of the volume by the first host until the volume is indicated by a volume status report to no longer be in use.

18. The method of claim 10 wherein use by a host includes a use which would conflict with use of the volume by another host.

19. A system, comprising:

a first host having a processor;

a storage controller having a processor and at least one storage unit controlled by the storage controller; and a computer program product comprising a computer readable storage medium having program instructions embodied therewith, a portion of the program instructions executable by a processor of the storage controller to cause storage controller processor operations, and a portion of the program instructions executable by a processor of the host to cause host processor operations, the storage controller processor operations comprising:

receiving from the first host, a volume status request for a volume of a storage unit controlled by the storage controller; and in response to the status request, returning a volume status report indicating whether the volume is in use by a host wherein use by a host includes changing the volume.

20. The system of claim 19 wherein the volume status report further indicates identity of a host using the volume if the volume is in use by a host.

21. The system of claim 19 wherein the volume status report further indicates whether the volume is on-line to a host and if so, further identifies a host to which the volume is on-line.

22. The system of claim 19 wherein the storage controller processor operations further comprise:

in response to ungrouping the volume and a host, updating an on-line status field of a status data structure for the volume indicating that the volume is off-line with respect to a host of the ungrouping; and updating an in-use status field of the status data structure for the volume indicating that the volume is not in use by a host of the ungrouping.

23. The system of claim 19 wherein the storage controller processor operations further comprise:

in response to grouping the volume of the storage unit and a second host having a path group ID unique to the second host, updating an on-line status field of a status data structure for the volume of the grouping to indicate that the volume is on-line to the second host of the grouping, and in response to ungrouping the volume and the second host of the grouping, the storage controller updating the on-line status field of the status data structure for the volume of the ungrouping to indicate that the volume is off-line to the second host of the ungrouping.

24. The system of claim 19 further comprises a second host having a processor, and wherein the computer program product further comprises a further computer readable storage medium having further program instructions embodied therewith, the further program instructions executable by a processor of the second host to cause second host processor operations, the second host processor operations comprising:

using the volume which has been grouped with the second host; and indicating to the storage controller that the volume is in use; and wherein the storage controller processor operations further comprise:

in response to the second host indicating that the volume is in use, updating an in-use status field of a status data structure for the volume indicating that the volume is in use.

25. The system of claim 24 wherein the second host processor operations further comprise:

terminating the use of the volume; and indicating to the storage controller that the volume is no longer in use; and wherein the storage controller processor operations further comprise:

in response to the second host indicating that the volume is no longer in use, updating the in-use status field of the status data structure for the volume indicating that the volume is not in use.

26. The system of claim 19 wherein the computer program product further comprises a further computer readable storage medium having further program instructions embodied therewith, the further program instructions executable by a processor of the first host to cause first host processor operations, the first host processor operations comprising:

in response to a volume status report indicating that the volume is in use by another host, deferring use of the volume by the first host until the volume is indicated by a volume status report to no longer be in use.

27. The system of claim 19 wherein use by a host includes a use which would conflict with use of the volume by another host.

* * * * *